US012205050B2

United States Patent
Negussie et al.

(10) Patent No.: US 12,205,050 B2
(45) Date of Patent: *Jan. 21, 2025

(54) PROACTIVELY DETECTING AND PREDICTING POTENTIAL BREAKAGE OR SUPPORT ISSUES FOR IMPENDING CODE CHANGES

(71) Applicant: Capital One Services, LLC, McLean, VA (US)

(72) Inventors: Sossena Negussie, McLean, VA (US); Michael Mossoba, Great Falls, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,833

(22) Filed: Jan. 18, 2024

(65) Prior Publication Data
US 2024/0152784 A1  May 9, 2024

Related U.S. Application Data

(63) Continuation of application No. 17/448,238, filed on Sep. 21, 2021, now Pat. No. 11,900,275.

(51) Int. Cl.
*G06F 8/65* (2018.01)
*G06F 8/77* (2018.01)
(Continued)

(52) U.S. Cl.
CPC ............. *G06N 5/04* (2013.01); *G06F 8/77* (2013.01); *G06N 5/022* (2013.01); *G06F 8/65* (2013.01);
(Continued)

(58) Field of Classification Search
CPC ....................................................... G06F 8/77
See application file for complete search history.

(56) References Cited

U.S. PATENT DOCUMENTS

| | | | | |
|---|---|---|---|---|
| 7,617,415 B1 * | 11/2009 | Kadakia | ............ | G06F 11/3676 717/124 |
| 9,235,854 B1 * | 1/2016 | O'Donnell | .......... | H04L 41/5096 |

(Continued)

OTHER PUBLICATIONS

Hammouri A., et al., "Software Bug Prediction using Machine Learning Approach," International Journal of Advanced Computer Science and Applications, vol. 9, No. 2, 2018, 6 pages. Retrieved from the Internet:[URL:https://thesai.org/Downloads/Volume9No2/Paper_12-Software_Bug_Prediction_using_Machine_Learning.pdf].

(Continued)

*Primary Examiner* — Jae U Jeon
(74) *Attorney, Agent, or Firm* — Harrity & Harrity, LLP (57) ABSTRACT

In some implementations, a regression prediction platform may obtain one or more feature sets related to an impending code change, wherein the one or more feature sets may include one or more features related to historical code quality for a developer associated with the impending code change or a quality of a development session associated with the impending code change. The regression prediction platform may provide the one or more feature sets to a machine learning model trained to predict a risk associated with deploying the impending code change based on a probability that deploying the impending code change will cause breakage after deployment and/or a probability that the impending code change will cause support issues after deployment. The regression prediction platform may generate one or more recommended actions related to the impending code change based on the risk associated with deploying the impending code change.

20 Claims, 5 Drawing Sheets

(51) Int. Cl.
    *G06N 5/022*    (2023.01)
    *G06N 5/04*     (2023.01)
    *G06F 11/36*    (2006.01)
(52) U.S. Cl.
    CPC ...... *G06F 11/3664* (2013.01); *G06F 11/3688* (2013.01)

(56) References Cited

U.S. PATENT DOCUMENTS

| | | | |
|---|---|---|---|
| 10,482,005 B1 * | 11/2019 | Benny | G06F 11/3688 |
| 11,132,249 B1 | 9/2021 | Puri et al. | |
| 11,334,351 B1 | 5/2022 | Pandurangarao et al. | |
| 2012/0110549 A1 * | 5/2012 | Gutz | G06F 11/3604 |
| | | | 717/127 |
| 2014/0245264 A1 | 8/2014 | Bartley et al. | |
| 2017/0116109 A1 | 4/2017 | Perez Acosta et al. | |
| 2017/0161179 A1 | 6/2017 | Maple et al. | |
| 2020/0097389 A1 * | 3/2020 | Smith | G06F 11/0793 |
| 2021/0056007 A1 | 2/2021 | Viswanathan et al. | |
| 2021/0141718 A1 | 5/2021 | Sandhu et al. | |
| 2023/0088784 A1 | 3/2023 | Negussie et al. | |

OTHER PUBLICATIONS

Shihab E., et al., "High-Impact Defects: A Study of Breakage and Surprise Defects," SIGSOFT/FSE'11 19th ACM SIGSOFT Symposium on the Foundations of Software Engineering {FSE-19} and ESEC'11: 13th European Software Engineering Conference {ESEC-13}, Sep. 5-9, 2011, 12 pages. Retrieved from the Internet:[URL: https://www.researchgate.net/publication/221560730_High-impact_defects_A_study_of_breakage_and_surprise_defects].

* cited by examiner

PROACTIVELY DETECTING AND PREDICTING POTENTIAL BREAKAGE OR SUPPORT ISSUES FOR IMPENDING CODE CHANGES

RELATED APPLICATION

This application is a continuation of U.S. patent application Ser. No. 17/448,238, filed Sep. 21, 2021, which is incorporated herein by reference in its entirety.

BACKGROUND

In a software development context, a regression generally refers to a software bug or a software flaw that causes one or more software features that had been working to cease working correctly. For example, a local regression may occur when a code change introduces a new bug in a software module or component modified by the code change, a remote regression may occur when a code change in one software module or component causes breakage in another software module or component, and an unmasked regression may occur when a code change reveals an existing bug that had no effect before the code change was introduced. In some cases, a performance regression may occur when modified software continues to function correctly but performance is worse than the previous version (e.g., the modified software is slower or uses more memory resources). One approach to avoiding a regression when introducing code changes is to perform regression testing. For example, in regression testing, one or more functional and/or non-functional tests are typically performed to determine whether previously developed and tested software still performs correctly after a code change is implemented.

SUMMARY

Some implementations described herein relate to a system for predicting code quality prior to deployment. The system may include one or more memories and one or more processors coupled to the one or more memories. The one or more processors may be configured to obtain one or more feature sets related to an impending code change. The one or more feature sets may include one or more features that relate to an impact that the impending code change has on an existing code base and one or more features that relate to a historical code quality for a developer associated with the impending code change or a quality of a development session associated with the impending code change. The one or more processors may be configured to provide the one or more feature sets to a machine learning model trained to indicate one or more recommended actions for the impending code change based on a predicted risk associated with deploying the impending code change. The predicted risk associated with deploying the impending code change may be based on one or more of a first probability that deploying the impending code change will cause code breakage, a second probability that deploying the impending code change will cause functionality breakage, or a third probability that deploying the impending code change will cause support issues. The one or more processors may be configured to trigger the one or more recommended actions for the impending code change.

Some implementations described herein relate to a method for predicting code breakage or support issues. The method may include obtaining, by a device, one or more feature sets related to an impending code change. The one or more feature sets may include one or more features that relate to a historical code quality for a developer associated with the impending code change or a quality of a development session associated with the impending code change. The method may include providing, by the device, the one or more feature sets to a machine learning model trained to predict a risk associated with deploying the impending code change. The predicted risk associated with deploying the impending code change may be based on one or more of a probability that deploying the impending code change will cause breakage after deployment or a probability that the impending code change will cause support issues after deployment. The method may include generating, by the device, one or more recommended actions related to the impending code change based on the risk associated with deploying the impending code change.

Some implementations described herein relate to a non-transitory computer-readable medium that stores a set of instructions for a device. The set of instructions, when executed by one or more processors of the device, may cause the device to obtain one or more feature sets related to an impending code change. The one or more feature sets may relate to one or more of an impact that the impending code change has on an existing code base, a historical code quality or a development session quality for a developer associated with the impending code change, or root cause data associated with one or more historical code changes that caused breakage or support issues. The set of instructions, when executed by one or more processors of the device, may cause the device to provide the one or more feature sets to a machine learning model trained to output a predicted risk associated with deploying the impending code change. The predicted risk associated with deploying the impending code change may be based on a probability that deploying the impending code change will cause breakage or support issues. The set of instructions, when executed by one or more processors of the device, may cause the device to perform one or more actions to mitigate the predicted risk associated with deploying the impending code change.

DETAILED DESCRIPTION

The following detailed description of example implementations refers to the accompanying drawings. The same reference numbers in different drawings may identify the same or similar elements.

Whenever a software developer or development team modifies or changes software, even a small change can have unexpected consequences. Accordingly, before deploying an impending code change to modify existing code in a code base and/or add new code to the code base, developers and quality assurance (QA) personnel typically subject the impending code change to regression testing to verify that the impending code change does not break any existing functionality. For example, regression testing is often performed in a testing environment prior to deployment in a live production environment in order to discover bugs or flaws that may have been accidentally introduced in a new build or release candidate, and to ensure that previously eradicated bugs or flaws do not resurface. For example, regression testing typically relies upon a regression testing suite that includes one or more functional and/or non-functional testing scenarios that were originally scripted when known problems were first discovered and fixed, which may be re-run when there is an impending code change to ensure that the impending code change does not cause a regression and/or backwards compatibility issue. However, although diligent regression testing using well-crafted regression testing suites can reduce the probability that a regression will occur, regression testing suites are only as good as what the QA engineers were able to think of at the time that the regression testing suites were written. As a result, regression testing suites often miss important integration points and/or potential impacts that human QA personnel may not have considered due to software products often having a high complexity. Furthermore, in agile software development, where software development life cycles tend to be very short, resources are typically scarce, and software changes occur frequently, using regression testing to detect potential problems with impending code changes may introduce significant overhead (e.g., delaying deployment and/or extending iterations).

Some implementations described herein relate to a regression prediction platform that may use one or more machine learning models or machine learning techniques to predict whether an impending code change is likely to cause code breakage, functionality breakage, and/or support issues. For example, in some implementations, the regression prediction platform may predict a probability that an impending code change will cause code breakage (e.g., where a software module or software component produces an incorrect or unexpected result or behaves in unintended ways in a testing environment) based on impact data that indicates how the impending code change may impact existing code in a code base, linting data that indicates programmatic and/or stylistic errors in the impending code change, historical data that relates to code quality for one or more developers associated with the impending code change, and/or development session data that indicates the quality of time that the developer(s) spent writing the code. Additionally, or alternatively, the regression prediction platform may predict a probability that an impending code change will cause functionality breakage (e.g., an incorrect or unexpected result or unintended behavior in a live production environment) based on data that indicates whether the impending code change adheres to applicable functional and technical requirements and/or root cause data related to past code changes that caused functionality breakage in addition to the features that are evaluated to predict code breakage. Additionally, or alternatively, the regression prediction platform may predict a probability that an impending code change will cause support issues (e.g., support requests and/or other events that may require the involvement of support personnel) based on root cause data related to past support issues and/or features such as a type of the impending code change and/or a quantity of integration points.

Accordingly, the regression prediction platform may utilize various data sources and machine learning techniques to proactively predict a probability and/or risk that an impending code change may cause breakage and/or support issues if the impending code change were to progress to a testing and/or deployment phase, and the regression prediction platform may recommend one or more actions to mitigate the probability or risk. In this way, the regression prediction platform may be used to detect and/or predict potential problems with an impending code change before the problems actually occur in a testing and/or production environment and may enable QA processes to mitigate risk and/or reduce the probability of breakage and/or support issues in current and/or future software development cycles.

Figure 1:
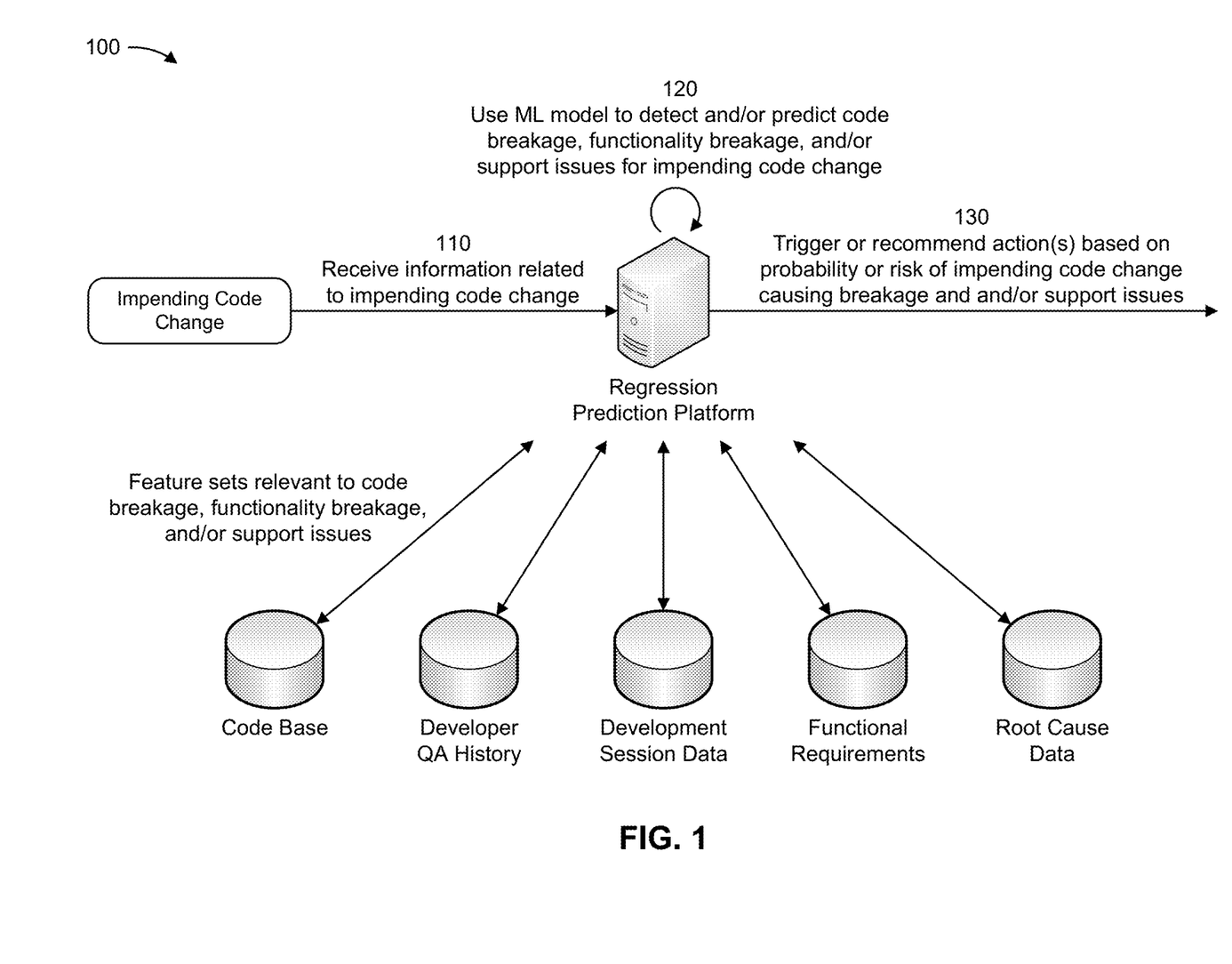
FIG. 1 is a diagram of an example implementation relating to proactively detecting and predicting potential breakage or support issues for impending code changes.

FIG. 1 is a diagram of an example 100 associated with proactively detecting and predicting potential breakage or support issues for impending code changes. As shown in FIG. 1, example 100 includes a regression prediction platform and one or more data repositories that store data relevant to detecting and predicting potential breakage or support issues for an impending code change. The regression prediction platform and the one or more data repositories are described in more detail below in connection with FIG. 3 and FIG. 4.

As shown in FIG. 1, and by reference number 110, the regression prediction platform may receive information related to an impending code change. As described herein, the term "impending code change" may generally refer any suitable set of changes to one or more computer programs or software applications that are scheduled or otherwise ready to be deployed to a live production environment. For example, in some implementations, an impending code change may include one or more code changes to modify existing code, add new code, and/or delete existing code in a code base associated with a program or software application. In general, the impending code change may include one or more code changes to the code base that are intended to repair bugs and/or security vulnerabilities in the code base or otherwise improve the functionality, usability, manageability, security, and/or performance of the modified computer program(s) or software application(s). For example, the impending code change may include a hotfix or quick fix engineering update designed to address one or more specific problems (e.g., bugs or security vulnerabilities) in a software product, a point release or maintenance release intended to fix bugs or implement small cleanups rather than introducing new content or features, a security patch to mitigate or remediate a security vulnerability, and/or a service pack or feature pack that includes a collection of updates, fixes, and/or enhancements to a software product that is delivered as a single installable package.

Although one or more developers may have written the impending code change in order to fix problems or otherwise improve functionality, usability, and/or performance of a software product (e.g., one or more computer programs or software applications), the impending code change may potentially introduce new problems (e.g., one or more regressions). For example, in some cases, the impending code change may include poor quality code that has the potential to cause code breakage, functionality breakage, and/or support issues.

For example, as described herein, the term "code breakage" may generally refer to one or more software bugs or flaws in an impending code change that causes one or more software modules or software components to produce an incorrect or unexpected result or to behave in unintended ways (e.g., by causing one or more features that had been working to cease working correctly, degrading performance of a software product, revealing or activating an existing bug that previously had no effect, introducing security vulnerabilities, and/or otherwise worsening the functionality, usability, manageability, security, and/or performance of a code base that is modified by the impending code change).

Furthermore, as described herein, the term "functionality breakage" may generally refer to the effects of deploying an impending code change that causes code breakage to a live production environment. In other words, an impending code change that causes code breakage (e.g., a code change discovered to introduce bugs or flaws in a development environment or a testing environment) may lead to functionality breakage if the impending code change were to be deployed to a live production environment. Additionally, or alternatively, functionality breakage may occur when an impending code change causes a modified code base to fail to satisfy acceptance criteria associated with one or more functional requirements and/or technical requirements that are defined for the affected software product (e.g., failing to adhere to one or more coding standards or coding practices, such as causing maintenance challenges by duplicating code in multiple places rather than using a common function or module).

Furthermore, as described herein, the term "support issues" may generally refer to technical support and/or break and fix services that are delivered for a software product deployed in a live production environment. For example, support issues may include a need for troubleshooting assistance, installation assistance, and/or usability assistance, which may be delivered through human assistance by support personnel via telephone or online communication media (e.g., chat, email, and/or desktop sharing) or through automated mechanisms such as a chat bot or automated support utilities. Accordingly, an impending code change may cause support issues when there are one or more changes that result in users needing troubleshooting assistance, installation assistance, and/or usability assistance, which may arise as users interact with a modified software product and/or uncover edge cases that may not be accounted for in one or more regression testing scenarios created by a development or software engineering team.

Accordingly, as shown by reference number 120, the regression prediction platform may use one or more machine learning models to detect and/or predict whether the impending code change is likely to cause code breakage, functionality breakage, and/or support issues prior to deploying the impending code change to a live production environment. For example, as shown in FIG. 1 and described herein, the regression prediction platform may obtain one or more feature sets from one or more data repositories that include data relevant to potential code breakage, functionality breakage, and/or support issues, and may predict a probability that the impending code change will cause code breakage, functionality breakage, and/or support issues using the one or more machine learning models based on the one or more feature sets. Additionally, or alternatively, the regression prediction platform may predict a risk associated with deploying impending code change based on the probability that the impending code change will cause code breakage, functionality breakage, and/or support issues. For example, in some implementations, an impending code change that has a low probability of causing code breakage, functionality breakage, and/or support issues may have a high deployment risk in cases where the impending code change impacts a high-priority function or a large number of users, or an impending code change that has a high probability of causing code breakage, functionality breakage, and/or support issues may have a low deployment risk in cases where the impending code change impacts a rarely used function or a small number of users. Accordingly, as described herein, the regression prediction platform may utilize various data sources to predict the probability that the impending code change will cause code breakage, functionality breakage, and/or support issues and/or the risk associated with deploying the impending code change, and the regression prediction platform may trigger or recommend one or more appropriate actions (e.g., to mitigate the deployment risk and/or configure safeguards to improve future code quality).

For example, in order to detect and/or predict the probability or risk that an impending code change will cause code breakage and/or functionality breakage, the regression prediction platform may scan an existing code base to be modified by the impending code change to assess how the impending code change may impact the existing code base. For example, in some implementations, the regression prediction platform may scan the code base to identify existing application program interface (API) endpoints that may be impacted by the impending code change, examine include statements, import statements, and/or other dependencies associated with the impending code change to ensure that the impending code change does not break logic in one or more included, imported, and/or dependent packages, and/or examine an inheritance hierarchy and/or upper level functions of the impending code change to ensure that the impending code change does not break logic in the upper level functions.

In some implementations, in order to detect and/or predict the probability that the impending code change will cause code and/or functionality breakage, the regression prediction platform may execute one or more automated tests that may be structured to test the functions of the impending code change and/or functions impacted by the impending code change. For example, in some implementations, the automated tests may be designed to execute various functions to test data interactions, test a user interface appearance, and/or test the effect of user interface elements, among other examples. Accordingly, in cases where the one or more automated tests fail, the regression prediction platform may detect that the impending code change causes code breakage and/or functionality breakage (e.g., predicting code breakage and/or functionality breakage with a 100% probability). Furthermore, in cases where the impending code change includes dependencies that have known issues (e.g., one or more security vulnerabilities or license issues have been reported for an included or imported package), the regression prediction platform may predict that the impending code change has a high probability of causing code breakage and/or is associated with a high deployment risk.

Additionally, or alternatively, when an impending code change is committed (e.g., submitted for deployment), the regression prediction platform may invoke one or more linting utilities that are configured to scan the impending code change for adherence to one or more coding best practices. For example, in some implementations, the linting utility may scan the impending code change to generate linting data that indicates whether the impending code changes includes procedural and/or stylistic errors (e.g., whether constructs are named or capitalized appropriately, whether spaces are in the correct place, whether code is duplicated or reused, and/or whether the impending code change otherwise adheres to coding standards for the programming language in which the impending code change is written). Accordingly, the regression prediction platform may predict the probability that the impending code change will cause code breakage and/or the risk associated with deploying the impending code change based on procedural and/or stylistic errors, if any, that are identified in the linting data.

In some implementations, the regression prediction platform may scan the existing code base to identify an impact (or potential impact) that the impending code change may have on existing code. For example, the code base may include a large number of dependencies among different packages, libraries, software modules, and/or other software components, whereby the code base may include one or more packages, libraries, software modules, and/or other software components that are dependent on a software component included in the impending code change (e.g., a change to a library that includes code associated with a user interface element that is used in many other functions may potentially have a large impact). Additionally, or alternatively, the regression prediction platform may scan the code base to obtain analytics data associated with the existing code base, such as specific times or time windows when certain applications have a high, moderate, and/or low usage and/or which applications have an overall high, moderate, and/or low usage, among other examples. Furthermore, in some implementations, the data sources that indicate the impact or potential impact of the impending code change may include one or more timing factors associated with the impending code change (e.g., whether there is a scheduled job to deploy the impending code change, how long the scheduled job is expected to execute, and/or how long similar jobs have taken to execute, among other examples).

In some implementations, as further shown in FIG. 1, the regression prediction platform may detect and/or predict the probability and/or risk of code breakage, functionality breakage, and/or support issues based on a QA history and/or development session data associated with one or more developers that worked on the impending code change. For example, the QA history may include historical data related to a quality of code produced by the one or more developers, such as bugs or security vulnerabilities that have been reported in the code produced by the one or more developers, a number of rollbacks of code changes implemented by the one or more developers, a history of procedural and/or stylistic errors found in code implemented by the one or more developers, a degree to which code implemented by the one or more developers adheres to coding best practices, and/or a history of code breakages, functionality breakages, and/or support issues introduced by code implemented by the one or more developers, among other examples. In another example, the QA history may relate to one or more peer reviewers of the impending code change. For example, a software deployment pipeline may include a peer review phase where one or more peer reviewers are responsible for reviewing code changes committed (e.g., sent to a data repository to be made a permanent part of the code base) by a developer. Accordingly, in some implementations, the QA history associated with the impending code change may include metrics associated with the one or more peer reviewers. For example, the regression prediction platform may predict a higher probability of code breakage, functionality breakage, and/or support issues in cases where code changes reviewed by the one or more peer reviewers have historically introduced a large number of bugs or flaws, or may predict a lower probability of code breakage, functionality breakage, and/or support issues when code reviewed by the one or more peer reviewers have a low history of QA issues.

Furthermore, as shown, the regression prediction platform may obtain development session data from the one or more data repositories in order to predict the code quality associated with the impending code change, which may be used to predict the probability and/or risk of code breakage, functionality breakage, and/or support issues for the impending code change. For example, in some implementations, the development session data may include data that indicates a duration of uninterrupted time that the developer(s) spent working on the impending code change (e.g., the predicted code quality may be higher if the development session(s) include a large uninterrupted development time during which the developer(s) had a high level of focus, sometimes referred to as a "flow state" in which a developer achieves a mental state of energized focus, involvement, and enjoyment in the coding process, which is more likely to produce high quality code). On the other hand, the predicted code quality may be lower in cases where the developers worked on the impending code change in several short bursts, during or between meetings, late at night, or in other circumstances where the developer may be more likely to be distracted, fatigued, or in an otherwise suboptimal cognitive state. In some implementations, the regression prediction platform may obtain the development session data from any suitable source, such as a project management tool (e.g., Jira) that indicates when and/or how long a developer was working on a particular project and/or an amount of time between state transitions for the project (e.g., from not started to in-progress or in-progress to complete), user calendar data that may indicate when the developer had meetings scheduled, activity logs that may indicate how long a developer was working within a single application or moving between different applications and/or whether the developer attended scheduled meetings, and/or commit logs that include timestamps indicating when code changes were submitted to a data repository to be made permanent, among other examples.

Accordingly, the regression prediction platform may provide the various inputs related to the development session quality to a machine learning model that may be trained or otherwise configured to indicate the predicted code quality for the impending code change. For example, in some implementations, timestamps related to commit times may be cross-referenced against calendar data to determine whether the developer was working on the impending code change during a large uninterrupted block (e.g., indicating a high code quality based on a focused cognitive state), whether the developer was working on the impending code change during or between meetings (e.g., indicating a low code quality based on a potentially distracted cognitive state), and/or whether the developer was working on the impending code change late at night or very early in the morning (e.g., indicating a low code quality based on a potentially fatigued cognitive state).

Furthermore, in some implementations, the feature sets that the regression prediction platform provides to the one or more machine learning models may include one or more functional requirements and/or technical requirements, which the regression prediction platform may use to predict a probability that the impending code change will cause functionality breakage. For example, in some implementations, the functional requirements may include one or more specifications that define functional behavior, such as a relationship between inputs and outputs. In some cases, the functional requirements may include calculations, technical details, data manipulations, and/or other specific functionality that defines the behavior of a software product. In some cases, the functional requirements may include one or more non-functional requirements, which may include design constraints or implementation constraints (e.g., performance, security, and/or reliability requirements). Furthermore, in some implementations, the technical requirements may generally relate to technical issues that the impending code change must satisfy (e.g., related to performance, reliability, and/or availability, among other examples). For example, in some implementations, the technical requirements may specify how code is to be built, which language the code is to be programmed in, which operating system the code is intended to execute on, and/or which standards the code must satisfy. Accordingly, in some implementations, the regression prediction platform may use the one or more machine learning models to predict the probability or risk that the impending code change will cause functionality breakage based on a degree to which the impending code change adheres to one or more functional and/or technical requirements in addition to the various other factors described in further detail elsewhere herein.

Additionally, or alternatively, the feature sets that the regression prediction platform provides to the one or more machine learning models may include root cause data that may be relevant to detecting and/or predicting functional breakage and/or support issues. For example, in some implementations, the regression prediction platform may scan one or more data repositories that contain data related to past code changes that have caused functionality breakage and root cause data indicating the reasons why the past code changes caused the functionality breakage. Accordingly, in some implementations, the regression prediction platform may provide information associated with the impending code change and the root cause data related to the past code changes that caused functionality breakage to detect and/or predict a probability that the impending code change will cause functionality breakage (e.g., based on similarities and/or differences between the impending code change and the past changes that caused functionality breakage and/or a frequency of past functionality breakages in the same functional area as the impending code change). Similarly, the one or more data repositories may include data related to past support issues (e.g., problems that users reported to support personnel in order to request troubleshooting, installation, and/or usability assistance) and root cause data that relates to historical reasons for certain support issues. Accordingly, in some implementations, the regression prediction platform may provide information associated with the impending code change and the root cause data related to the past support issues to detect and/or predict a probability that the impending code change will cause support issues (e.g., based on a type of change implemented in the impending code change, impacted modules, and/or a number of integration points touched by the impending code change, among other examples).

As further shown in FIG. 1, and by reference number 130, the regression prediction platform may trigger one or more actions or recommend one or more actions based on the probability or risk of the impending code change causing breakage (e.g., code breakage and/or functionality breakage) and/or the probability or risk of the impending code change causing support issues. For example, in some implementations, the regression prediction platform may be configured to input one or more feature sets that include data relevant to potential breakage and/or support issues to one or more machine learning models that are trained or otherwise configured to predict the probability of the impending code change causing breakage and/or support issues. Furthermore, as described above, the one or more machine learning models may output a risk associated with deploying the impending code change, which may be based on the probability of the impending code change causing breakage and/or support issues and/or other factors such as the priority or usage associated with the software modules or packages that may be impacted by the impending code change. Accordingly, based on the probability or risk of the impending code change causing breakage and/or support issues, the regression prediction platform may trigger or recommend one or more appropriate actions. For example, in cases where there is a significant probability or risk of breakage or support issues, the regression prediction platform may trigger or recommend one or more actions to mitigate the risk and/or resolve the breakage or support issues.

For example, in some implementations, the one or more actions may include configuring or recommending a deployment pattern that minimizes a potential impact of the impending code change. For example, the regression prediction platform may determine a time window when usage associated with one or more applications impacted by the impending code change is lowest and schedule deployment to occur during the time window when potential impact is lowest. In another example, the deployment pattern may include a rollout plan, such as a canary deployment, a blue/green deployment, or another suitable deployment pattern used to limit the impact of deploying a code change that has the potential to cause breakage or support issues. Additionally, or alternatively, in cases where there is a very high probability that the impending code change will cause breakage or support issues and/or deploying the impending code change carries a high risk, the regression prediction platform may recommend that the impending code change not be deployed and/or may recommend additional review, testing, and/or approval prior to deployment. Additionally, or alternatively, the regression prediction platform may scan the code base to identify users that interact with and/or have access to functions that may be impacted by the impending code change, and the regression prediction platform may send notifications or other messages to the impacted users to alert the users that an impending code change that may cause breakage and/or support issues is about to be deployed. In some cases, the users may be further provided with a capability to provide feedback on the impending code change, such as whether the users experienced breakage and/or support issues after the deployment. In addition, in some implementations, the regression prediction platform may trigger or recommend a deployment pattern in which support personnel are notified when a high risk code change is to be deployed such that the support personnel can prepare an appropriate rollback plan and/or be prepared to respond to breakage and/or support requests (e.g., keeping old instances active after deployment in case the deployed code change needs to be rolled back and/or controlling how much traffic is routed to new instances until the code change has been deemed to be stable).

Furthermore, in some implementations, the regression prediction platform may trigger or recommend one or more actions to reduce a probability or risk associated with future code changes causing breakage and/or support issues. For example, in some cases, a code change may be subject to a code coverage requirement, which is a measure to describe a degree to which source code is executed when a particular testing suite is run (e.g., a percentage of lines of source code that are successfully validated in a testing procedure, which may indicate how comprehensively the impending code change was verified). Accordingly, in some implementations, the regression prediction platform may trigger or recommend an action to adjust a code coverage requirement for a developer that wrote the impending code change based on the impending code change having a high probability or risk of breakage and/or support issues. For example, if a default code coverage requirement to enable deployment of an impending code change is normally 80%, the code coverage requirement may be increased to 95% based on the developer committing a code change with a high probability or risk of breakage and/or support issues. In another example, the regression prediction platform may adjust a number of peer reviews that may be required for code that is committed by the developer based on a high probability or risk of breakage and/or support issues. In this way, the regression prediction platform may assist with introducing additional safeguards to reduce the probability that a developer will continue to submit poor quality code in the future.

As indicated above, FIG. 1 is provided as an example. Other examples may differ from what is described with regard to FIG. 1.

Figure 2:
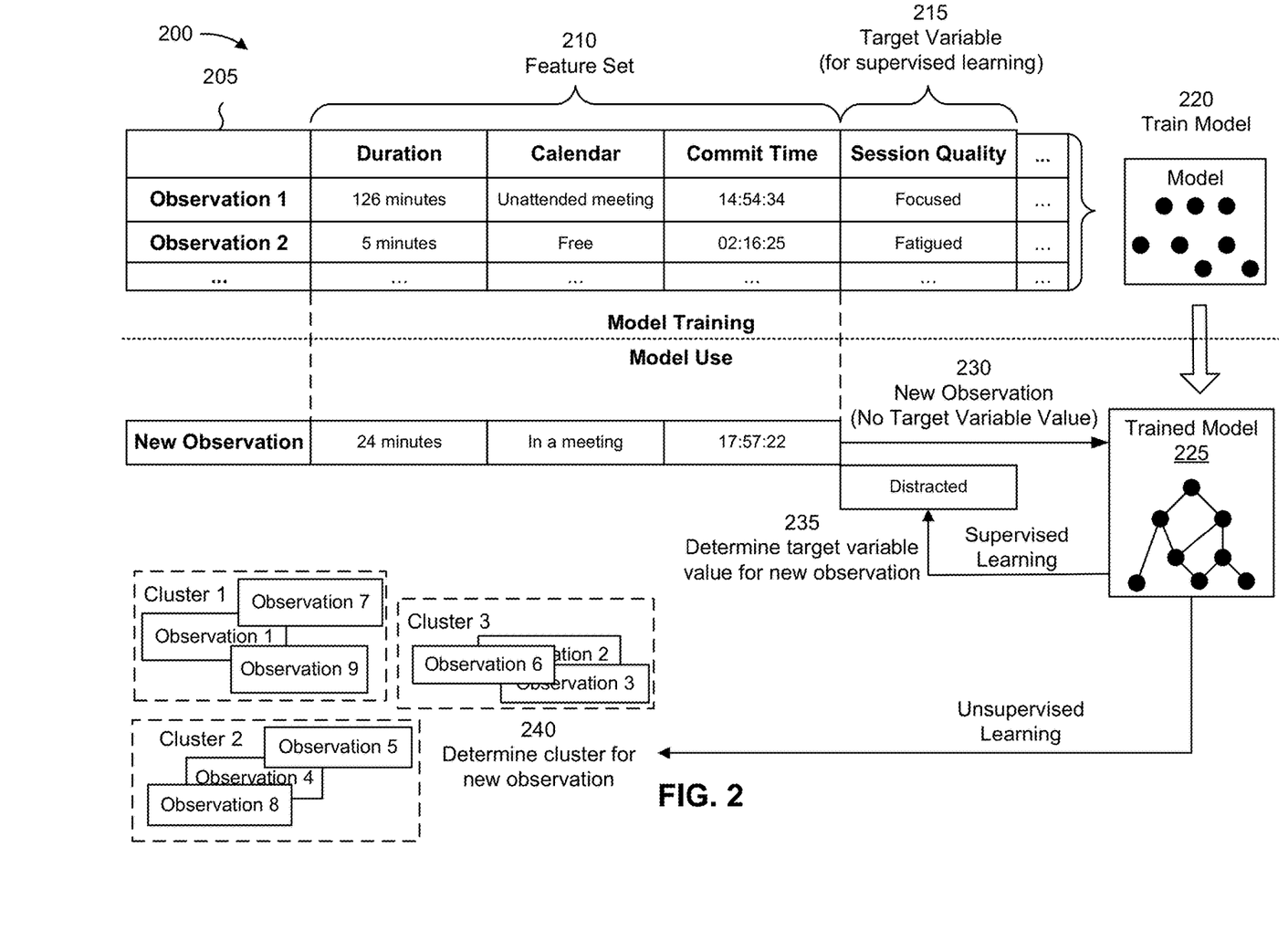
FIG. 2 is a diagram illustrating an example of training and using a machine learning model in connection with proactively detecting and predicting potential breakage or support issues for impending code changes.

FIG. 2 is a diagram illustrating an example 200 of training and using a machine learning model in connection with proactively detecting and predicting potential breakage or support issues for impending code changes. The machine learning model training and usage described herein may be performed using a machine learning system. The machine learning system may include or may be included in a computing device, a server, a cloud computing environment, or the like, such as the regression prediction platform described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from one or more data repositories that contain data relevant to a risk of an impending code change causing code breakage, functionality breakage, and/or support issues, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the one or more data repositories. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a duration feature, a calendar feature, a commit time feature, and so on. As shown, for a first observation, the duration feature may have a value of 126 minutes, the calendar feature may have a value indicating an unattended meeting, the commit time feature may have a value of 14:54:34 (2:54 PM), and so on. The features and feature values are provided as examples and may differ in other examples. For example, the feature set may include one or more of the following features: a number of bursts in a development session, prior code quality metrics, a repository type, and/or workload status, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is session quality, which has a value of "focused" for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a duration feature, a calendar feature, a commit time feature, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of "distracted" for the target variable of session quality for the new observation, as shown by reference number 235 (e.g., based on the development session occurring while the developer was in a meeting, as indicated by the calendar feature). Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, adjusting a code coverage requirement for the developer and/or a number of peer reviewers that are required to approve code changes by the developer of the impending code change. The first automated action may include, for example, notifying support personnel to prepare a rollback plan and/or alerting users that a high risk code change is about to be deployed.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., development sessions in which the developer was distracted), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., development sessions in which the developer was focused), then the machine learning system may provide a second (e.g., different) recommendation (e.g., a recommended deployment pattern) and/or may perform or cause performance of a second (e.g., different) automated action, such as triggering deployment of the impending code change. As another example, if the machine learning system were to classify the new observation in a third cluster (e.g., development sessions in which the developer was fatigued), then the machine learning system may provide a third (e.g., different) recommendation (e.g., an additional peer review) and/or may perform or cause performance of a third (e.g., different) automated action, such as adjusting a release or deployment time window to reduce impact.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to proactively predict whether an impending code change will cause potential breakage and/or support issues. The machine learning system enables recognition and/or identification of tens, hundreds, thousands, or millions of features and/or feature values for tens, hundreds, thousands, or millions of observations, thereby increasing accuracy and consistency and reducing delay associated with detecting and/or predicting breakage and/or support issues caused by an impending code change relative to requiring computing resources to be allocated for tens, hundreds, or thousands of operators to manually detect and/or predict breakage and/or support issues caused by an impending code change using the features or feature values.

As indicated above, FIG. 2 is provided as an example. Other examples may differ from what is described in connection with FIG. 2.

Figure 3:
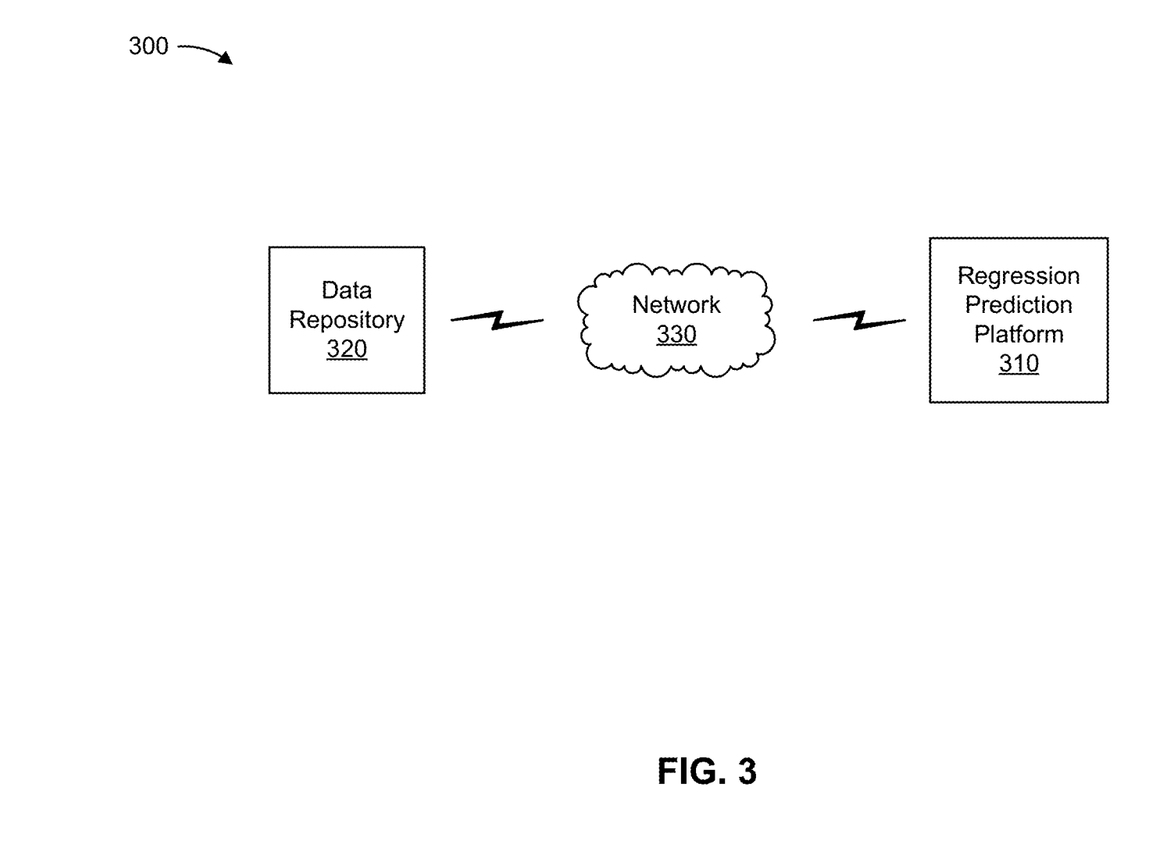
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a regression prediction platform 310, a data repository 320, and a network 330. Devices of environment 300 may interconnect via wired connections, wireless connections, or a combination of wired and wireless connections.

The regression prediction platform 310 includes one or more devices capable of receiving, generating, storing, processing, providing, and/or routing information associated with proactively detecting and predicting potential breakage or support issues for impending code changes, as described elsewhere herein. The regression prediction platform 310 may include a communication device and/or a computing device. For example, the regression prediction platform 310 may include a server, such as an application server, a client server, a web server, a database server, a host server, a proxy server, a virtual server (e.g., executing on computing hardware), or a server in a cloud computing system. In some implementations, the regression prediction platform 310 includes computing hardware used in a cloud computing environment.

The data repository 320 includes one or more devices capable of receiving, generating, storing, processing, and/or providing information associated with proactively detecting and predicting potential breakage or support issues for impending code changes, as described elsewhere herein. The data repository 320 may include a communication device and/or a computing device. For example, the data repository 320 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data repository 320 may communicate with one or more other devices of environment 300, as described elsewhere herein.

The network 330 includes one or more wired and/or wireless networks. For example, the network 330 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 330 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
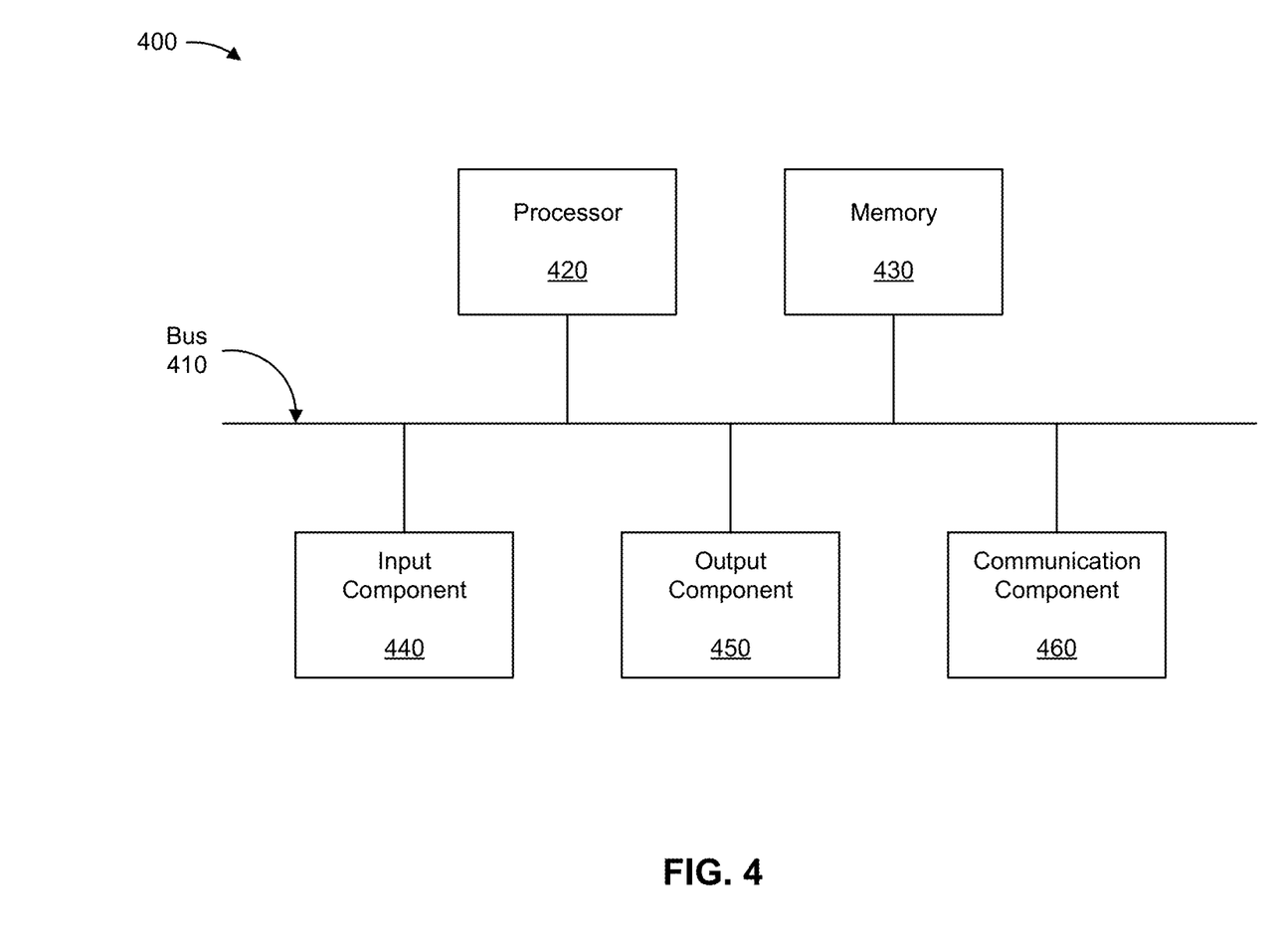
FIG. 4 is a diagram of example components of one or more devices of FIG. 3.

FIG. 4 is a diagram of example components of a device 400, which may correspond to the regression prediction platform 310 and/or the data repository 320 shown in FIG. 3. In some implementations, the regression prediction platform 310 and/or the data repository 320 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
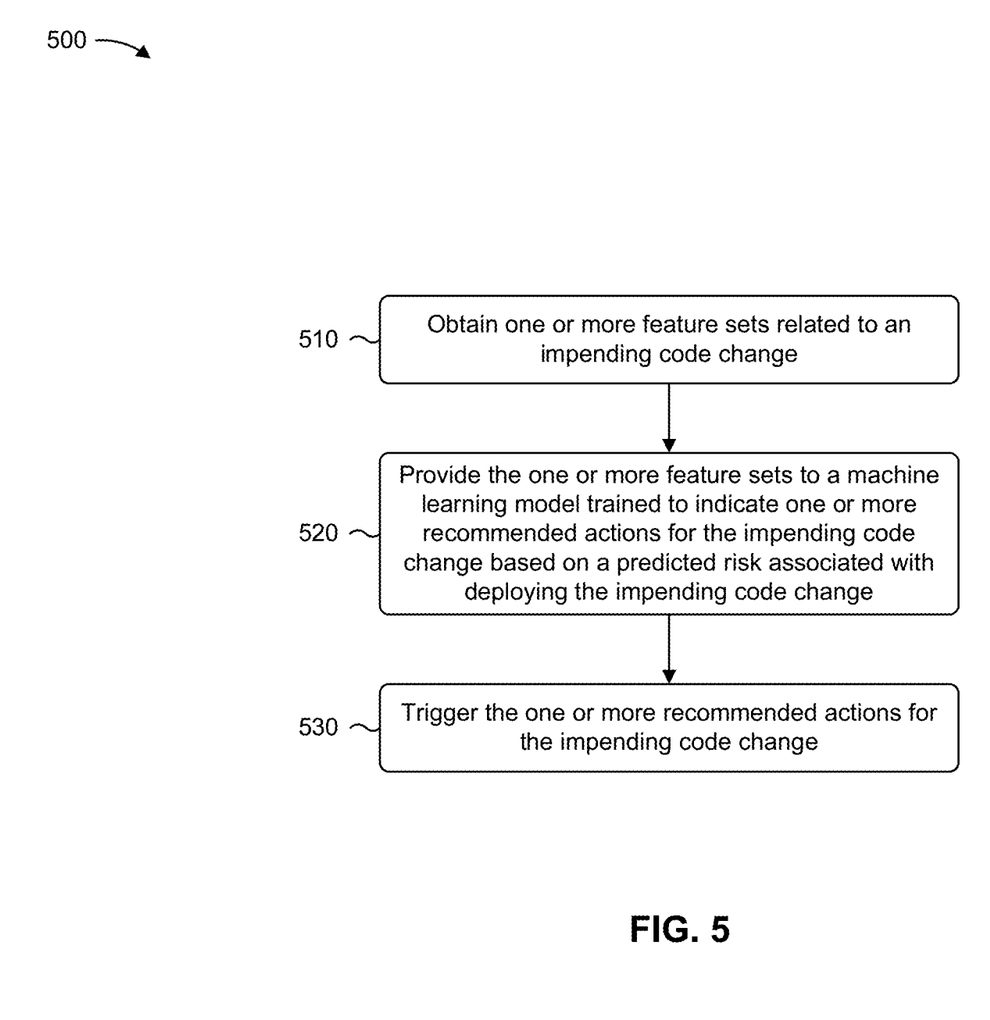
FIG. 5 is a flowchart of an example process relating to proactively detecting and predicting potential breakage or support issues for impending code changes.

FIG. 5 is a flowchart of an example process 500 associated with proactively detecting and predicting potential breakage or support issues for impending code changes. In some implementations, one or more process blocks of FIG. 5 may be performed by a regression prediction platform (e.g., regression prediction platform 310). In some implementations, one or more process blocks of FIG. 5 may be performed by another device or a group of devices separate from or including the regression prediction platform, such as the data repository 320. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include obtaining one or more feature sets related to an impending code change (block 510). In some implementations, the one or more feature sets include one or more features that relate to an impact that the impending code change has on an existing code base and one or more features that relate to a historical code quality for a developer associated with the impending code change or a quality of a development session associated with the impending code change. As further shown in FIG. 5, process 500 may include providing the one or more feature sets to a machine learning model trained to indicate one or more recommended actions for the impending code change based on a predicted risk associated with deploying the impending code change (block 520). In some implementations, the predicted risk associated with deploying the impending code change is based on one or more of a first probability that deploying the impending code change will cause code breakage, a second probability that deploying the impending code change will cause functionality breakage, or a third probability that deploying the impending code change will cause support issues. As further shown in FIG. 5, process 500 may include triggering the one or more recommended actions for the impending code change (block 530).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device comprising:
one or more memories; and one or more processors, coupled to the one or more memories, configured to:
extract, based on data related to a code change, one or more feature sets related to the code change,
wherein the one or more feature sets include one or more first features that relate to an impact that the code change has on an existing code base and one or more second features that relate to a historical quality associated with the code change,
wherein the one or more feature sets further include one or more timestamps associated with one or more commit times associated with the code change, and
wherein the one or more feature sets include calendar data associated with the code change;
provide the one or more feature sets to a machine learning model trained to indicate one or more recommended actions for the code change based on a predicted risk associated with deploying the code change,
wherein the predicted risk is based on one or more of a first probability that the code change will cause breakage, or a second probability that the code change will cause a support issue, and
wherein the predicted risk is further based on cross-referencing the one or more commit times with the calendar data;
configure, based on providing the one or more feature sets to the machine learning model and based on determining endpoints that will be impacted by the code change, a deployment pattern associated with the code change; and
control, based on the deployment pattern, network traffic routed to new instances associated with the code change.

2. The device of claim 1, wherein the data related to the code change is obtained from another device associated with a project management tool.

3. The device of claim 1, wherein information related to the historical quality associated with the code change comprises at least one of:
information related to quality associated with a developer related to the code change, or
information related to a session associated with the code change.

4. The device of claim 1, wherein the one or more processors are further configured to:
determine a time window when usage associated with one or more applications impacted by the code change is lowest; and
schedule deployment of the code change during the time window.

5. The device of claim 1, wherein the breakage is associated with at least one of code breakage or functionality breakage.

6. The device of claim 1, wherein the endpoints are associated with application program interface endpoints.

7. The device of claim 1, wherein the one or more processors are further configured to:
identify users that interact with functions that are impacted by the code change; and
send alert notifications to the users.

8. A non-transitory computer-readable medium storing a set of instructions, the set of instructions comprising:
one or more instructions that, when executed by one or more processors of a device, cause the device to:
extract, based on data related to a code change, one or more feature sets related to the code change,
wherein the one or more feature sets include one or more first features that relate to an impact that the code change has on an existing code base and one or more second features that relate to a historical quality associated with the code change,
wherein the one or more feature sets further include one or more timestamps associated with one or more commit times associated with the code change, and
wherein the one or more feature sets include calendar data associated with the code change;
provide the one or more feature sets to a machine learning model trained to indicate one or more recommended actions for the code change based on a predicted risk associated with deploying the code change, wherein the predicted risk is based on one or more of a first probability that the code change will cause breakage, or a second probability that the code change will cause a support issue, and wherein the predicted risk is further based on cross-referencing the one or more commit times with the calendar data;

configure, based on providing the one or more feature sets to the machine learning model and based on determining endpoints that will be impacted by the code change, a deployment pattern associated with the code change; and control, based on the deployment pattern, network traffic routed to new instances associated with the code change.

9. The non-transitory computer-readable medium of claim 8, wherein the data related to the code change is obtained from another device associated with a project management tool.

10. The non-transitory computer-readable medium of claim 8, wherein information related to the historical quality associated with the code change comprises at least one of:

information related to quality associated with a developer related to the code change, or information related to a session associated with the code change.

11. The non-transitory computer-readable medium of claim 8, wherein the one or more instructions further cause the device to:

determine a time window when usage associated with one or more applications impacted by the code change is lowest; and schedule deployment of the code change during the time window.

12. The non-transitory computer-readable medium of claim 8, wherein the breakage is associated with at least one of code breakage or functionality breakage.

13. The non-transitory computer-readable medium of claim 8, wherein the endpoints are associated with application program interface endpoints.

14. The non-transitory computer-readable medium of claim 8, wherein the one or more instructions further cause the device to:

identify users that interact with functions that are impacted by the code change; and send alert notifications to the users.

15. A method, comprising:

extracting, by a device and based on data related to a code change, one or more feature sets related to the code change, wherein the one or more feature sets include one or more first features that relate to an impact that the code change has on an existing code base and one or more second features that relate to a historical quality associated with the code change, wherein the one or more feature sets further include one or more timestamps associated with one or more commit times associated with the code change, and wherein the one or more feature sets include calendar data associated with the code change;

providing, by the device, the one or more feature sets to a machine learning model trained to indicate one or more recommended actions for the code change based on a predicted risk associated with deploying the code change, wherein the predicted risk is based on one or more of a first probability that the code change will cause breakage, or a second probability that the code change will cause a support issue, and wherein the predicted risk is further based on cross-referencing the one or more commit times with the calendar data;

configuring, by the device and based on providing the one or more feature sets to the machine learning model and based on determining endpoints that will be impacted by the code change, a deployment pattern associated with the code change; and controlling, by the device and based on the deployment pattern, network traffic routed to new instances associated with the code change.

16. The method of claim 15, wherein the data related to the code change is obtained from another device associated with a project management tool.

17. The method of claim 15, wherein information related to the historical quality associated with the code change comprises at least one of:

information related to quality associated with a developer related to the code change, or information related to a session associated with the code change.

18. The method of claim 15, further comprising:

determining a time window when usage associated with one or more applications impacted by the code change is lowest; and scheduling deployment of the code change during the time window.

19. The method of claim 15, wherein the breakage is associated with at least one of code breakage or functionality breakage.

20. The method of claim 15, wherein the endpoints are associated with application program interface endpoints.

* * * * *